US008955740B2

United States Patent
Magnell

(10) Patent No.: US 8,955,740 B2
(45) Date of Patent: Feb. 17, 2015

(54) SYSTEM AND METHOD MEASURING OBJECTS OF RANDOM SIZE OR SHAPE

(71) Applicant: Plymouth Packaging Inc., Battle Creek, MI (US)

(72) Inventor: Greg Magnell, Vicksburg, MI (US)

(73) Assignee: Plymouth Packaging Inc., Battle Creek, MI (US)

( * ) Notice: Subject to any disclaimer, the term of this patent is extended or adjusted under 35 U.S.C. 154(b) by 0 days.

(21) Appl. No.: 13/900,921

(22) Filed: May 23, 2013

(65) Prior Publication Data

US 2013/0327823 A1 Dec. 12, 2013

Related U.S. Application Data

(60) Provisional application No. 61/651,380, filed on May 24, 2012.

(51) Int. Cl.
| | |
|---|---|
| G06F 17/00 | (2006.01) |
| G06K 7/10 | (2006.01) |
| G01D 21/00 | (2006.01) |
| G01B 11/00 | (2006.01) |
| G06F 17/30 | (2006.01) |

(52) U.S. Cl.
CPC ............... *G06F 17/30* (2013.01); *G01B 11/00* (2013.01)
USPC .......... 235/375; 235/462.01; 702/156; 33/1 V

(58) Field of Classification Search
CPC ...... G01B 3/1084; G01B 11/00; G01F 17/00; G01D 21/00
USPC .......... 235/375, 462.1–462.49; 702/152, 156; 33/1 V See application file for complete search history.

(56) References Cited

U.S. PATENT DOCUMENTS

| | | | | |
|---|---|---|---|---|
| 2,736,095 | A | * | 2/1956 | Krauss ............................ 33/1 R |
| 5,331,118 | A | * | 7/1994 | Jensen ......................... 177/25.14 |
| 5,528,517 | A | * | 6/1996 | Loken ............................ 702/156 |
| 6,615,104 | B2 | | 9/2003 | England et al. |
| 7,085,687 | B2 | | 8/2006 | Eckenwiler et al. |
| 7,366,643 | B2 | | 4/2008 | Verdura et al. |
| 2003/0083763 | A1 | | 5/2003 | Kiyohara et al. |
| 2003/0200111 | A1 | | 10/2003 | Damji |
| 2005/0236487 | A1 | * | 10/2005 | Kaner ...................... 235/462.45 |

* cited by examiner

*Primary Examiner* — Michael G Lee
*Assistant Examiner* — Laura Gudorf
(74) *Attorney, Agent, or Firm* — Gifford, Krass, Sprinkle, Anderson & Citkowski, P.C.

(57) ABSTRACT

A system and method are used for measuring objects of random size or shape. An object to be measured is received on a horizontal deck with rollers. A first vertical surface at an angle to the deck creates a first inside corner. One or both of the deck and first vertical surfaces including a plurality of computer-readable codes, each code representing a distance from the first inside corner. A reader is provided for reading the computer-readable codes associated with the greatest physical extent of the object in one of two dimensions. The system may further include a second vertical surface, thereby creating a second inside corner to measure an object or group of objects in three dimensions. The second vertical surface folds down, thereby enabling an operator to move the object or objects off of the deck, past the second vertical surface, and onto another deck or platform.

14 Claims, 1 Drawing Sheet

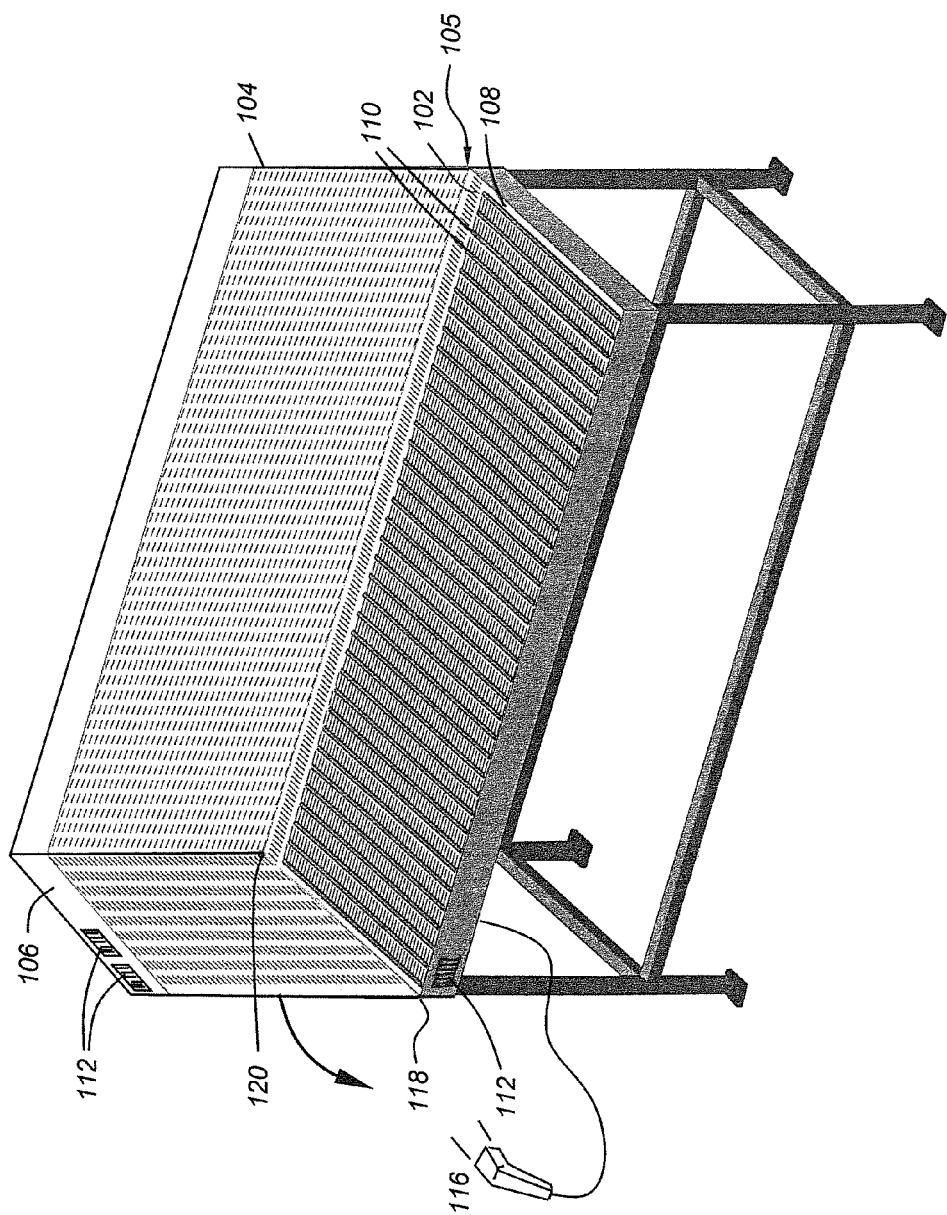

SYSTEM AND METHOD MEASURING OBJECTS OF RANDOM SIZE OR SHAPE

REFERENCE TO RELATED APPLICATION

This application claims priority from U.S. Provisional Patent Application Ser. No. 61/651,380, filed May 24, 2012, the entire content of which is incorporated herein by reference.

FIELD OF THE INVENTION

This invention relates generally to measurement apparatus and, in particular, to a system and method for measuring objects of random size or shape.

BACKGROUND OF THE INVENTION

There are many industries that must measure objects having different sizes or shapes for packaging, shipping, warehousing, and other operations. There are commercially available carton-producing machines that are capable of producing customized boxes in various sizes and styles. Such machines use corrugated cardboard to produce boxes on demand that vary in dimensions typology and quantity. Required box dimensions are either input manually or determined from a bar code associated with a previously generated list of carton sizes. Based upon this input, fan-fold raw material having a sufficient width is drawn from a station and delivered to a staging area. From there, the material is cut and scored to produce a flat panel that may be folded and glued or stapled to produce a box large enough to fit the object to be packaged. Although such systems reduce waste by providing material of varying width, a more automated dimensioning capability would enhance efficiency and reduce costs.

SUMMARY OF THE INVENTION

This invention resides in a system for measuring objects of random size or shape. The system comprises a horizontal deck with rollers to receive an object or objects to be measured and a first vertical surface at an angle to the deck creating a first inside corner into which at least one object is positioned for measurement. One or both of the deck and first vertical surfaces including a plurality of computer-readable codes, each code representing a distance from the first inside corner. A reader is provided for reading the computer-readable codes associated with the greatest physical extent of the object in one of two dimensions, one of the dimensions being parallel to the deck and the other dimension being parallel to the first vertical surface. Codes may be provided between the rollers on the deck. The computer-readable codes may be bar codes, in which case the reader is a bar-code scanner.

The system further including a second vertical surface at an angle to both the deck and the first vertical surface, thereby creating a second inside corner. The second vertical surface may also include a plurality of computer-readable codes enabling the reader to determine the greatest physical extent of the object in a third dimension from the second inside corner parallel to the second vertical surface. The second vertical surface folds down, thereby enabling an operator to move the object or objects off of the deck, past the second vertical surface, and onto another deck or platform. The various surfaces may be orthogonal to one another, with the plurality of codes being arranged as a matrix on each surface. The system may further include computer-readable control codes to CANCEL, REPEAT, or SEND the codes associated with the greatest physical extent of the object to a carton-making machine or other piece of equipment.

A method of measuring an object of random size or shape, comprising the steps of providing a deck physical measurement apparatus comprising a horizontal deck with rollers to receive an object or objects to be measured, a first vertical surface at an angle to the deck creating a first inside corner into which at least one object is positioned for measurement, and wherein one or both of the deck and first vertical surfaces including a plurality of computer-readable codes, each code representing a distance from the first inside corner. The method includes rolling an object onto the deck such that the object also touches the first vertical surface, and reading the computer-readable codes associated with the greatest physical extent of the object in one of two dimensions, one of the dimensions being parallel to the deck and the other dimension being parallel to the first vertical surface.

The method may further include the steps of providing a second vertical surface forming a second inside corner with the deck, the second vertical surface including a plurality of computer-readable codes, each code representing a distance from the second inside corner, and reading the computer-readable codes associated with the greatest physical extent of the object in three dimensions, the first dimension being parallel to the deck, the second dimension being parallel to the first vertical surface, and the third dimension being parallel to the second vertical surface.

BRIEF DESCRIPTION OF THE DRAWING

FIG. 1 shows a deck used in the dimensional measuring process.

DETAILED DESCRIPTION OF THE INVENTION

This invention resides in cost-effective apparatus and methods facilitating the measurement of objects of random size and shape for any application, including the manufacture of corrugated cartons or protective corrugated inner-packs that are specifically sized to individual objects or groups of objects. The apparatus combines a deck with rollers and one or more walls or surfaces with machine-readable codes. A code scanner is used to read the codes and feed dimensional information to a processing unit with software to interpret and transmit the data to a box-making machine or other application-specific equipment.

The preferred embodiment provides a simple, inexpensive system and accompanying method to measure an object or group of objects by rolling the object(s) onto the deck and reading the codes most representative of the overall dimensions. FIG. 1 depicts the deck used in the dimensional measuring process. The deck 108 has an upper, generally horizontal surface 102 with rollers 110. A first vertical surface 104 is oriented normal to the deck surface, and a second, optional vertical surface 106 may be provided normal to both the first vertical surface and the deck surface. The first vertical surface 104 establishes a first insider corner 105, and the second vertical surface 106 establishes a second insider corner 118 which may comprise a hinge as described below. The two inside corners 105, 118 intersect at inside point 120.

Some or all of the surfaces include a matrix of bar codes or other machine-readable codes using hand-held scanner 116, which shown with a cord may in fact be wireless. The second surface 106 may be optional in that the codes on the first surface 104 and the deck 102 may be sufficient to obtain height, length and width information. If provided, the second surface 106 may fold down along hinge 118 to enable the object(s) to roll across the deck from one end to another as part of a process flow.

Each row of codes comprises a unique ID or measurement value. Each row may or may not have an equal spacing from the row above or below, and each matrix may comprise from one to multiple columns. Each matrix for each surface may use a unique symbol within a row ID that corresponds to the length, width or height value. "Special" codes 112 may also be provided to perform operations such as CANCEL, REPEAT, or SEND the data. Such special codes may be delivered to a carton-making machine or other piece of equipment.

In operation, a user rolls the object(s) onto the deck and in alignment with a reference point or line or, up against panel 106 in FIG. 1 if the panel is provided. The user then scans the codes on the surface representing the greatest physical extend of the object(s) with a wireless or corded handheld scanner. For example, particularly if surfaces 104, 106 are both present, a user would transfer and object or objects as far into corner 120 as possible.

Once positioned, the operator uses a handheld scanner to read those codes on surfaces 104, 106 and deck 108 corresponding to the greatest height, width and length of the object or objects. The operator would do this by aligning their line of sight with the outermost extent of the object(s) to the corresponding codes on the various surfaces, then scanning those codes identified through this alignment. If one or more dimensions are already known or unimportant, the apparatus may be used only for height, or width or length by scanning only the codes on one or two of the surfaces as opposed to a three-dimensional measurement.

With measuring complete, the scanning system may send the dimensional data to a processing unit programmed with software to operate a box-making machine or other application-specific equipment. The processing unit may be a PC, PLC, tablet, smart phone, or other processor with a primary input interface (i.e., serial (RS-232 or similar), keyboard wedge, USB, blue-tooth, Ethernet IP, wireless IP based, or other), an output interface (serial (RS-232 or similar), Ethernet, wireless, or other), and a secondary input interface, keyboard, touch screen, or etc.

The data represent the actual value of the measurement (120 mm or 10", etc), or it may be an ID of a row in a matrix whereby a lookup table is used to equate a measurement value against a row ID. The data received may further include a symbol that identifies the type of ID or measurement received (length, width or height type). The measurement values may be stored or formatted into an output format pertaining to a protocol required and transmitted via an output interface. For example, the software may include options for user to input other attributes to send to a box-making machine (quantity, type of box to be used, type of corrugated web material to be used).

The software may also automatically interpret measurements to provide other attributes to send to a box-making machine. Based on the dimensions received and type or design of carton to use, the carton-making machine should be able to automatically position all cutting and scoring mechanisms, and feed/index raw material to produce the appropriately sized carton. Examples of this type of machine are manufactured by Panotec SRL of Italy, Autobox of the United Kingdom, Emsize of Sweden, and T-ROC of Arkansas USA.

The invention claimed is:

1. A system for measuring objects of random size or shape, comprising:
    a horizontal deck with rollers to receive an object or objects to be measured;
    a first vertical surface at an angle to the deck creating a first inside corner into which at least one object is positioned for measurement;
    both of the deck and first vertical surfaces including a two-dimensional matrix of computer-readable codes, each code representing a distance from the first inside corner;
    wherein the codes of the deck are arranged in lines between a plurality of the rollers to form the two-dimensional matrix of codes; and
    a reader for reading the computer-readable codes associated with the greatest physical extent of the object in one of two dimensions, one of the dimensions being parallel to the deck and the other dimension being parallel to the first vertical surface.

2. The system of claim 1, further including a second vertical surface at an angle to both the deck and the first vertical surface, thereby creating a second inside corner; and
    wherein the second vertical surface includes a two-dimensional matrix of computer-readable codes enabling the reader to determine the greatest physical extent of the object in a third dimension from the second inside corner parallel to the second vertical surface.

3. The system of claim 1, wherein the computer-readable codes are bar codes, and the reader is a bar-code scanner.

4. The system of claim 1, wherein the deck and first vertical surfaces are orthogonal to one another.

5. The system of claim 1, wherein all of the surfaces are mutually orthogonal.

6. The system of claim 1, further including computer-readable control codes to CANCEL, REPEAT, or SEND the codes associated with the greatest physical extent of the object to a carton-making machine or other piece of equipment.

7. The system of claim 2, wherein the second vertical surface folds down, thereby enabling an operator to move the object or objects off of the deck, past the second vertical surface, and onto another deck or platform.

8. A system for measuring objects of random size or shape, comprising:
    a horizontal deck with rollers to receive an object or objects to be measured;
    a first vertical surface at an angle to the deck creating a first inside corner into which at least one object is positioned for measurement;
    a second vertical surface at an angle to both the deck and the first vertical surface, thereby creating a second inside corner;
    the deck, first vertical surface, and second vertical surface each including a two-dimensional matrix of computer-readable codes, each code encoding a distance to one of the inside corners;
    wherein the codes of the deck are arranged in lines between a plurality of the rollers to form the two-dimensional matrix of codes; and
    a reader for reading the computer-readable codes to determine the outermost physical extent of the object or objects in three dimensions.

9. The system of claim 8, wherein the computer-readable codes are bar codes, and the reader is a bar-code scanner.

10. The system of claim 8, further including computer-readable control codes to CANCEL, REPEAT, or SEND the codes associated with the greatest physical extent of the object to a carton-making machine or other piece of equipment.

11. A method of measuring an object of random size or shape, comprising the steps of:
- providing a deck physical measurement apparatus comprising a horizontal deck with rollers to receive an object or objects to be measured, a first vertical surface at an angle to the deck creating a first inside corner into which at least one object is positioned for measurement,
- wherein both of the deck and first vertical surfaces includes a two-dimensional matrix of computer-readable codes, each code representing a distance from the first inside corner, with the codes of the deck are arranged in lines between a plurality of the rollers to form the two-dimensional matrix of codes;
- rolling an object onto the deck such that the object also touches the first vertical surface; and
- reading the computer-readable codes associated with the greatest physical extent of the object in one of two dimensions, one of the dimensions being parallel to the deck and the other dimension being parallel to the first vertical surface.

12. The method of claim 11, including the steps of:
- providing a second vertical surface forming a second inside corner with the deck, the second vertical surface including a two-dimensional matrix of computer-readable codes, each code representing a distance from the second inside corner;
- rolling an object onto the deck such that the object touches both the first and second vertical surfaces; and
- reading the computer-readable codes associated with the greatest physical extent of the object in three dimensions, the first dimension being parallel to the deck, the second dimension being parallel to the first vertical surface, and the third dimension being parallel to the second vertical surface.

13. The method of claim 11, wherein the computer-readable codes are scannable bar codes.

14. The method of claim 12, wherein the deck and vertical surface are mutually orthogonal.

* * * * *